UNITED STATES PATENT OFFICE.

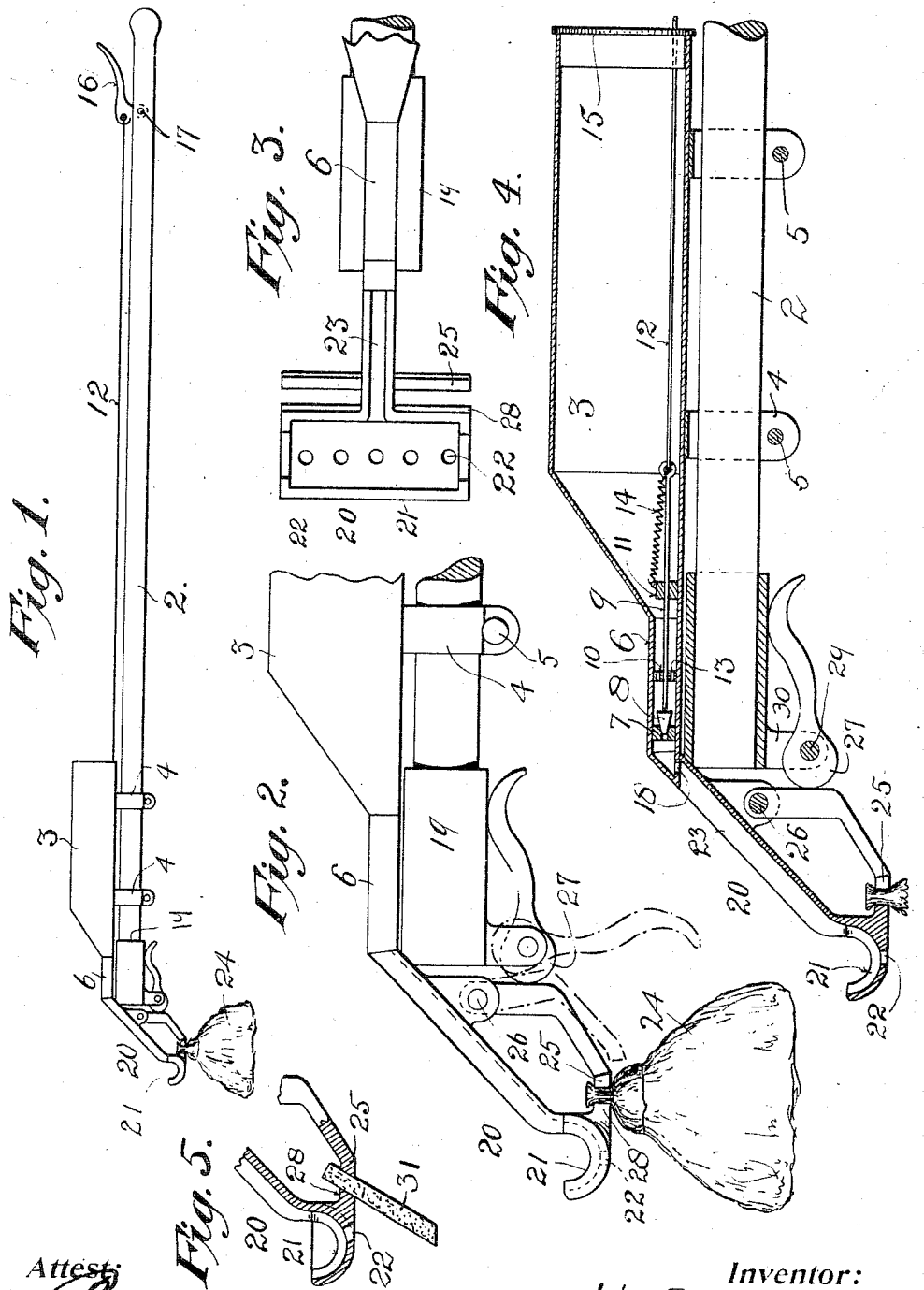
J. F. FITCH.
FLOOR RUBBER.
APPLICATION FILED MAY 25, 1910.
995,125.  Patented June 13, 1911.
Inventor:
John F. Fitch,
by Richard W. Barkley,
his Atty.

JOHN F. FITCH, OF BUCHANAN, VIRGINIA.

FLOOR-RUBBER.

995,125.

Specification of Letters Patent.   Patented June 13, 1911.

Application filed May 25, 1910. Serial No. 563,677.

*To all whom it may concern:*

Be it known that I, JOHN F. FITCH, a citizen of the United States, and a resident of Buchanan, in the county of Botetourt and State of Virginia, have invented a certain new and useful Improvement in Floor-Rubbers, of which the following is a specification.

My invention relates to a fountain floor mop, scrubber, oiler or rubber, the primary object of the invention being to apply a liquid at will to a floor and to spread the same over the floor as and where desired.

According to this invention, a fountain or reservoir for the oil, soap and water, or other fluid is attached to a handle and is provided with a hand-operated valve for controlling the flow of liquid from the reservoir or fountain. From the fountain, the liberated liquid flows along a suitable channel to a distributing holder and through holes in the bottom of such holder, on to the floor or the mop, spreader, or rubber, and may be spread evenly and smoothly on the floor. The mop, spreader, or rubber is clamped between a fixed jaw (which forms, in the instance shown, part of said distributing holder) and a movable jaw, which movable jaw is held in working position in any suitable manner, but preferably by a cam or knuckle.

The preferred form of the invention is illustrated in the accompanying drawing, forming part hereof, in which—

Figure 1 is a side elevation of the device; Fig. 2 is a similar view, on a larger scale, of part thereof; Fig. 3 is a plan of the distributing holder, etc.; Fig. 4 is a central vertical sectional view of the last; and Fig. 5 is a detail view of a modification.

In the drawing, the reference numeral 2 designates a handle, to the lower end of which it attached a reservoir 3 for the liquid to be used in the apparatus. In the instance shown, the reservoir or fountain 3, which may be made of sheet-metal, is provided with clamps 4 arranged in pairs the members of which are drawn toward each other by screws or rivets 5 to cause them to grip the handle 2 between them and thereby retain the reservoir in place. The lower end of the reservoir 3 is reduced in diameter, as at 6, and such reduced portion is closed tightly by the perforated disk 7, which forms a seat for a valve 8. The stem 9 of the valve 8 passes through one or more guides 10, 11, and is hooked to or articulated with a draw-wire 12. In the instance shown, the guide 10 is within the reduced portion 6, and such guide is provided with channels or grooves, as at 13, to allow the liquid used to pass to the outlet. A spring 14 acts to keep the valve 8 normally seated, said spring, in the instance shown, being a tension spring. The draw-wire 12 passes through the removable cover 15 of the reservoir 3 and connects with a lever 16 which is fulcrumed at 17 on the handle 2. By pressing the lever toward the handle 2, the rod 12 is caused to open the valve 8 to allow the liquid to flow through the disk 7 and a hole 18 in the end 6.

A sleeve 19, fast on the end of the handle 2, has attached thereto or formed in one therewith a T-head 20 which is grooved or channeled at 23 in the stem of the T to convey the liquid flowing from the reservoir through the hole 18 to a distributing holder 21 in the cross-bar of the T forming part of said head. In the instance illustrated both channels 21 and 23 are open-top. The holder 21 is perforated at 22 at or near the bottom thereof to allow the liquid to flow through the bottom and on to the floor or the mop or the like.

The mop, scrubber, spreader, or rubber 24 is clamped between a fixed jaw, as the rear edge of the holder 21, and a movable jaw 25. The jaw 25 is shown as being pivotally connected at 26 between lugs cast or formed on the underside of the channel-way 23, and a cam-lever 27 is shown for pressing said movable jaw toward the holder 21 or a rib 28 thereon, to clamp and lock the mop, rubber, scrubber, or spreader 24 in place. The lever 27 is pivoted at 29 between lugs or ears 30 on the sleeve 19 aforesaid.

It is obvious that a strip of felt or the like, see 31, may replace the cloth indicated in Figs. 1, 2 and 4.

In the use of the device, the handle 2 stands at about an angle of 45° to the horizontal, when the mop is on the floor. The oil or liquid in the reservoir 3 is allowed to flow out slowly by pressing the lever 16 toward the handle 2, thus opening the valve at 8, the liquid then flowing out through the hole 18 and into the channel 23 and down to the holder 21 and through the holes 22 to the floor or mop 24, and is spread on the floor by moving the mop to and fro thereon.

The invention is not limited to the precise form thereof shown in the drawing and above described, but may be otherwise embodied without departing from the spirit or the scope of the claim hereof.

What I claim as new and desire to secure by Letters Patent of the United States is—

In a floor rubber, the combination of a handle, a reservoir carried by the handle and formed with a discharge opening, a valve controlling the outflow through the discharge opening, a T shaped head applied to the end of the handle, the cross bar of the said head being formed with a trough having perforations in the bottom thereof, while the stem is formed with a channel leading from the said trough to the discharge opening of the reservoir, a fixed jaw being provided which extends along one side of the cross bar of the T shaped head, a movable jaw mounted upon the stem of the T shaped head and adapted to coöperate with the fixed jaw to grip a rubbing element, and means for holding the movable jaw in operative position.

Signed at Buchanan in the county of Botetourt and State of Virginia, this 24" day of May, A. D. 1910.

JOHN F. FITCH.

Witnesses:
W. C. BARKER,
A. W. HARVEY.